(12) United States Patent
Motoki

(10) Patent No.: US 8,742,834 B2
(45) Date of Patent: Jun. 3, 2014

(54) NEGATIVE-VOLTAGE CHARGE PUMP CIRCUIT

(75) Inventor: Kenichi Motoki, Kyoto (JP)

(73) Assignee: Rohm Co., Ltd. (JP)

(*) Notice: Subject to any disclaimer, the term of this patent is extended or adjusted under 35 U.S.C. 154(b) by 619 days.

(21) Appl. No.: 13/086,607

(22) Filed: Apr. 14, 2011

(65) Prior Publication Data
US 2011/0274295 A1 Nov. 10, 2011

(30) Foreign Application Priority Data
Apr. 14, 2010 (JP) ................................. 2010-093132

(51) Int. Cl.
*G05F 1/10* (2006.01)

(52) U.S. Cl.
USPC .......................................... 327/536; 381/120

(58) Field of Classification Search
CPC ........ H03F 3/68; H03F 2200/03; H03F 3/181
USPC ............ 381/120, 28, 174, 107, 123; 330/307, 330/260, 254, 310, 297; 327/212, 558, 532, 327/536
See application file for complete search history.

(56) References Cited

U.S. PATENT DOCUMENTS

| | | | |
|---|---|---|---|
| 8,339,186 B2* | 12/2012 | Wang | 327/536 |
| 2008/0159567 A1* | 7/2008 | Lesso et al. | 381/120 |
| 2013/0314151 A1* | 11/2013 | Lesso | 327/536 |

FOREIGN PATENT DOCUMENTS

| | | | | |
|---|---|---|---|---|
| JP | 63-217971 A | 9/1988 | | |
| JP | 2001-186754 A | 7/2001 | | |
| JP | 2005-318787 A | 11/2005 | | |
| JP | 2007-28726 A | 2/2007 | | |
| JP | 2007-174785 | * 5/2007 | ............. | H03M 3/07 |
| JP | 2007-174785 A | 7/2007 | | |
| JP | 2007-202317 A | 8/2007 | | |
| WO | 2004/025817 A1 | 3/2004 | | |

OTHER PUBLICATIONS

Japanese Office Action, Notification of Reasons for Refusal for Patent Application No. 2010-093132, Dated Mar. 11, 2014 with English translation.

* cited by examiner

*Primary Examiner* — Lun-See Lao
(74) *Attorney, Agent, or Firm* — Cantor Colburn LLP

(57) ABSTRACT

A control unit alternately repeats a first state in which a first switch and a third switch are on and a second state in which a second switch and a fourth switch are on. A voltage detection unit compares the output voltage that occurs at one terminal (OUT terminal) of an output capacitor with a negative threshold voltage, and generates an abnormality detection signal which is asserted when the output voltage is higher than the threshold voltage Vt. When the abnormality detection signal is asserted, the control unit switches the on resistance of the first switch to a value that is higher than that in a normal state.

14 Claims, 7 Drawing Sheets

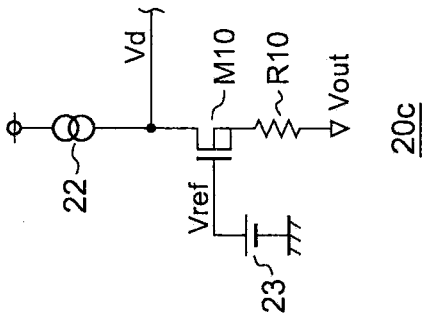
FIG.3C
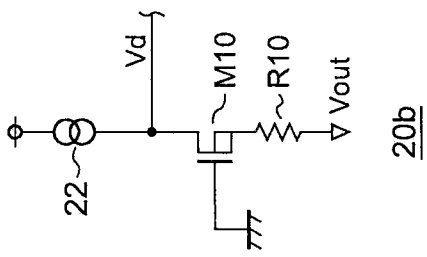
FIG.3B
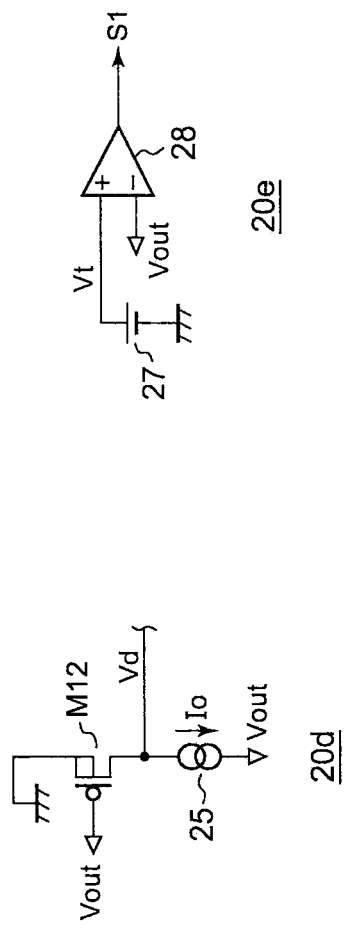
FIG.3E
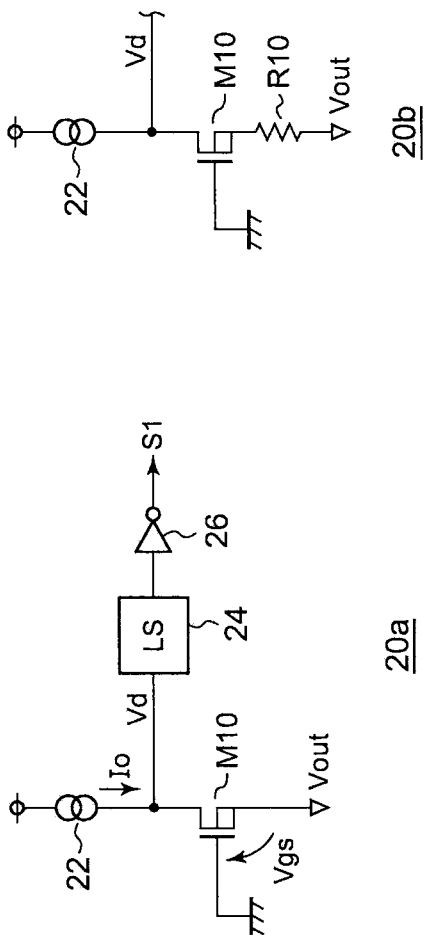
FIG.3A
FIG.3D

300

NEGATIVE-VOLTAGE CHARGE PUMP CIRCUIT

BACKGROUND OF THE INVENTION

1. Field of the Invention

The present invention relates to a charge pump circuit configured to generate a negative voltage, and particularly to overcurrent protection in such a circuit.

2. Description of the Related Art

In order to convert a DC voltage having a certain level into a DC voltage having a different level, a charge pump circuit is employed. The charge pump circuit has a configuration including several capacitors and several switches. With such a charge pump circuit, a particular capacitor (which is also referred to as a "flying capacitor") is charged using the input voltage, and energy (charge) stored in the flying capacitor is transferred to another capacitor (which is also referred to as an "output capacitor") so as to boost or step down the input voltage, or so as to invert the polarity of the input voltage, thereby outputting the output voltage thus boosted, stepped down, or inverted.

FIG. 1 is a circuit diagram which shows a configuration of a charge pump circuit configured to generate a negative voltage. A charge pump circuit 1002 includes a flying capacitor $C_F$, an output capacitor $C_H$, and a first switch SW1 through a fourth switch SW4. The charge pump circuit 1002 alternately repeats the first state $\phi1$ and the second state $\phi2$ so as to generate a negative output voltage Vout, which is then output from the output terminal P2.

In the first state $\phi1$, the first switch SW1 and the third switch SW3 are turned on, and the other switches are turned off. In this state, the flying capacitor $C_F$ is charged using the input voltage Vin. Subsequently, in the second state $\phi2$, the second switch SW2 and the fourth switch SW4 are turned on, and the other switches are turned off. In this state, the output capacitor $C_H$ is charged using a negative voltage (−Vin). By alternately repeating the first state $\phi1$ and the second state $\phi2$, such an arrangement generates the negative voltage Vout at the output capacitor $C_H$.

RELATED ART DOCUMENTS

Patent Documents

[Patent document 1]
Japanese Patent Application Laid Open No. 2007-028726
[Patent document 2]
Japanese Patent Application Laid Open No. 2001-186754
[Patent document 3]
Japanese Patent Application Laid Open No. 2007-174785

It is known that such a charge pump circuit 1002 has a problem in that a very large inrush current (rush current) flows through the flying capacitor $C_F$ and the output capacitor $C_H$ when they have a charge amount of zero immediately after the charge pump circuit 1002 is started up. In order to solve such a problem, various countermeasures have been proposed. However, at present, there are no countermeasures for solving a problem of various kinds of circuit abnormalities that occur after the output voltage Vout of the charge pump circuit 1002 is stabilized.

For example, let us consider a case in which a positive-side terminal (CP terminal) of the flying capacitor $C_F$ is shorted to ground in the operation of the charge pump circuit 1002. In this case, in the first state $\phi1$, a power supply (e.g., battery) connected to the input terminal P1 is shorted to ground via the first switch SW1. In some cases, this leads to the occurrence of overcurrent.

On the other hand, in a case in which the output terminal (OUT terminal) via which the output capacitor $C_H$ is connected is shorted to ground, all the charge stored in the flying capacitor $C_F$ flows out in the second state $\phi2$. Accordingly, in the next transition to the first state $\phi1$, overcurrent flows from the input terminal P1 to the flying capacitor $C_F$.

SUMMARY OF THE INVENTION

The present invention has been made in order to solve such a problem. Accordingly, it is an exemplary purpose of an embodiment of the present invention to provide a charge pump circuit which is capable of preventing the occurrence of overcurrent in the operation thereof.

An embodiment of the present invention relates to a control circuit for a negative voltage charge pump circuit configured to receive an input voltage and to generate a negative output voltage. The control circuit comprises: a first switch arranged between one terminal of a flying capacitor and an input terminal; a second switch arranged between the aforementioned one terminal of the flying capacitor and a ground terminal; a third switch arranged between the other terminal of the flying capacitor and the ground terminal; a fourth switch arranged between the other terminal of the flying capacitor and one terminal of the output capacitor; a control unit configured to alternately repeat a first state in which the first switch and the third switch are on and a second state in which the second switch and the fourth switch are on; and a voltage detection unit configured to compare the output voltage that occurs at the aforementioned one terminal of the output capacitor with a predetermined negative voltage, and to generate an abnormality detection signal which is asserted when the output voltage is higher than the threshold voltage. When the abnormality detection signal is asserted, the control unit raises the on resistance of the first switch in the on state.

When an abnormal state occurs, e.g., when one terminal of the flying capacitor is shorted to ground, or when one terminal of the output capacitor is shorted to ground, the output voltage of the negative voltage charge pump circuit becomes higher than the voltage level thereof in the normal state. Thus, by comparing the output voltage with a predetermined threshold voltage, such an arrangement is capable of detecting such an abnormal state. Furthermore, by raising the impedance of the first switch when an abnormal state occurs, such an arrangement is capable of preventing overcurrent, thereby protecting the circuit.

Also, the first switch may comprise a main switch having a first on resistance and a sub-switch having a second on resistance that is higher than the first on resistance. Also, when the abnormality detection signal is asserted in the first state, the control unit may turn on only the sub-switch. Also, when the abnormality detection signal is negated, the control unit may turn on at least the main switch.

Also, the first switch may comprise multiple switches arranged in parallel. Also, the control unit may switch, according to the abnormality detection signal, the switch which is to be turned on in the first state.

Also, the first switch may be configured as a MOSFET (Metal Oxide Semiconductor Field Effect Transistor). Also, the control unit may be configured to change the gate voltage of the first switch so as to change the on resistance of the first switch.

Also, the voltage detection unit may comprise: a current source; and an N-channel MOSFET arranged such that the drain thereof is connected to the current source, the output voltage is applied to the source thereof, and the gate is set to a fixed electric potential. Also, a signal that corresponds to a voltage that occurs at the drain of the N-channel MOSFET may be output as the abnormality detection signal.

Such an arrangement is capable of performing voltage comparison using the gate-source threshold voltage of the N-channel MOSFET.

Also, a ground voltage may be applied to the gate of the N-channel MOSFET. Such an arrangement provides a simple circuit configuration.

Also, a positive or negative reference voltage may be applied to the gate of the N-channel MOSFET. Such an arrangement allows the threshold voltage to be adjusted according to the level of the reference voltage.

Also, the voltage detection unit may further comprise a resistor arranged between the source of the N-channel MOSFET and the output voltage terminal.

Also, the voltage detection unit may comprise a comparator configured to compare the output voltage with a predetermined reference voltage. Also, the voltage detection unit may output an output signal of the comparator as the abnormality detection signal. Such an arrangement provides precise abnormality detection signal.

Also, the voltage detection unit may comprise: a P-channel MOSFET arranged such that the source thereof is grounded, and the output voltage is applied to the gate thereof; and a current source connected to the drain of the P-channel MOSFET. Also, a signal that corresponds to a voltage that occurs at the drain of the P-channel MOSFET may be output as the abnormality detection signal.

Also, when the abnormality detection signal is asserted, the control unit may raise the on resistance of the second switch in the on state. By controlling the on resistance of the second switch, such an arrangement prevents overcurrent even if one terminal of the flying capacitor is shorted to (connected to) the power supply terminal.

Another embodiment of the present invention relates to a charge pump circuit. The charge pump circuit comprises: a flying capacitor; an output capacitor; and a control circuit according to any one of the aforementioned embodiments, connected to the flying capacitor and the output capacitor.

Yet another embodiment of the present invention relates to an electronic device. The electronic device comprises: a battery; and a charge pump circuit configured to receive a voltage from the battery, and to generate a negative voltage.

Yet another embodiment of the present invention relates to an audio system. The audio system comprises: an amplifier configured to amplify an audio signal; and the aforementioned charge pump circuit configured to supply a negative power supply voltage for the amplifier.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 3A through 3E are circuit diagrams each showing an example configuration of a voltage detection unit;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, a state represented by the phrase "the member A is connected to the member B" includes a state in which the member A is indirectly connected to the member B via another member that does not affect the electric connection therebetween, in addition to a state in which the member A is physically and directly connected to the member B.

Similarly, a state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 2:
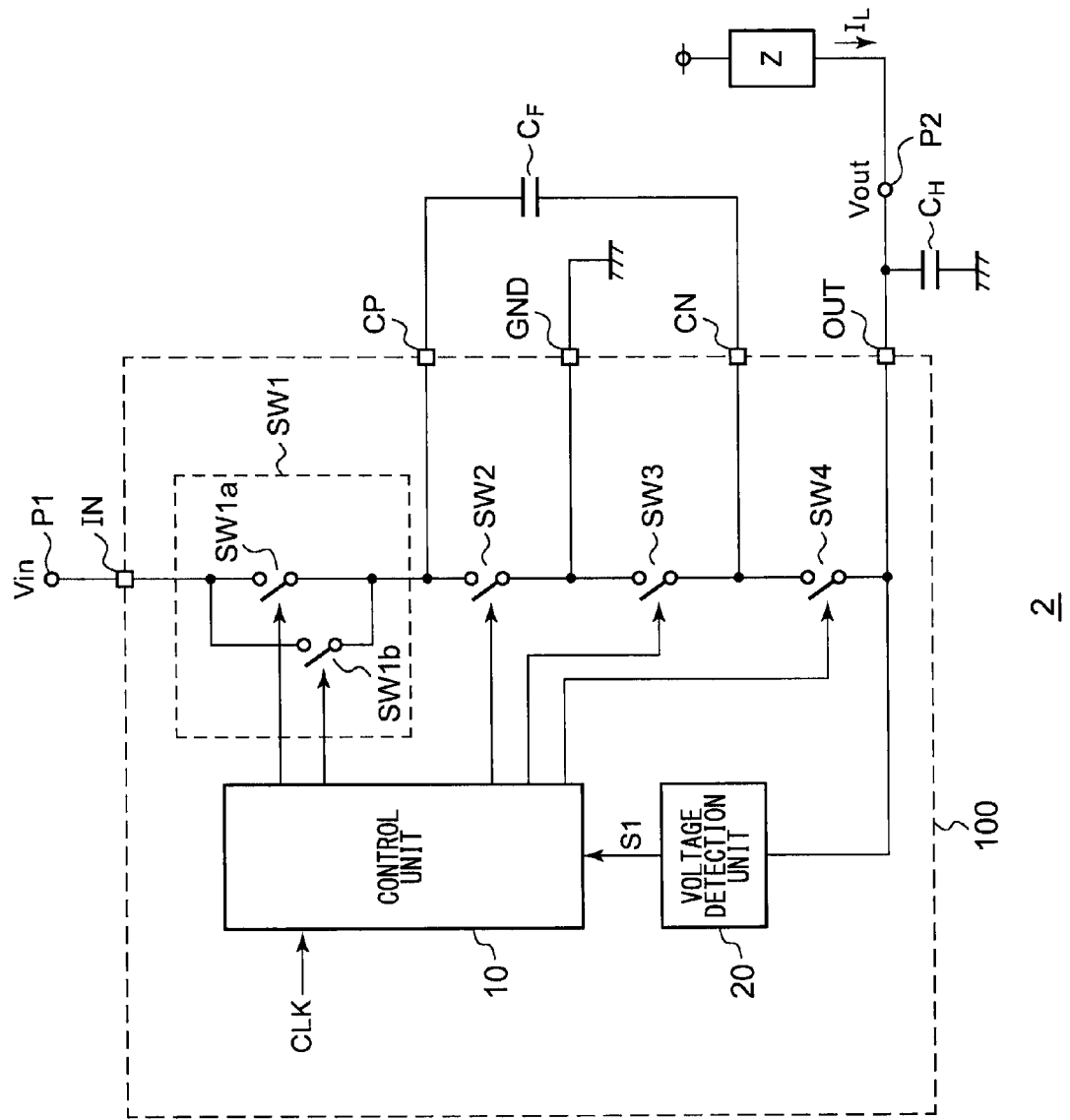
FIG. 2 is a circuit diagram which shows a configuration of a charge pump circuit according to an embodiment.

FIG. 2 is a circuit diagram which shows a configuration of a charge pump circuit 2 according to an embodiment. The charge pump circuit 2 inverts the polarity of the input voltage Vin input to the input terminal P1, and outputs the negative output voltage Vout via an output terminal P2. The charge pump circuit 2 is mounted on a battery-driven electronic device, for example. Examples of such electronic devices include laptop PCs, digital still cameras, digital video cameras, audio players, cellular phone terminals, etc., including a circuit block that requires a negative voltage. However, such an electronic device is not restricted in particular.

The charge pump circuit 2 includes a flying capacitor $C_F$, an output capacitor $C_H$, and a control circuit 100.

The output capacitor $C_H$ is arranged such that one terminal thereof is connected to the output terminal P2, and the other terminal thereof is grounded. The control circuit 100 includes an input terminal IN (IN terminal), an output terminal (OUT terminal), two capacitor terminals (CP terminal and CN terminal), and a ground terminal GND (GND terminal). The IN terminal is connected to the input terminal P1, and the input voltage Vin is applied to the IN terminal from an unshown power supply (battery or regulator). The CP terminal is connected to one terminal of the flying capacitor $C_F$, and the CN terminal is connected to the other terminal of the flying capacitor $C_F$. The OUT terminal is connected to the output terminal P2 and one terminal of the output capacitor $C_H$. The GND terminal is grounded.

The control circuit 100 includes a first switch SW1 through a fourth switch SW4, a control unit 10, and a voltage detection unit 20.

The first switch SW1 is arranged between one terminal (CP terminal) of the flying capacitor $C_F$ and the input terminal IN. The second switch SW2 is arranged between the aforementioned one terminal (CP terminal) of the flying capacitor $C_F$ and the ground terminal (GND terminal). The third switch SW3 is arranged between the other terminal (CN terminal) of the flying capacitor $C_F$ and the ground terminal (GND terminal). The fourth switch SW4 is arranged between the other terminal (CN terminal) of the flying capacitor $C_F$ and one terminal (OUT terminal) of the output capacitor $C_H$.

The control unit 10 controls the states of the first switch SW1 through the fourth switch SW4 in synchronization with a clock signal CLK. Specifically, the first state φ1 and the second state φ2 are alternately repeated in synchronization with the clock signal CLK. In the first state φ1, the first switch SW1 and the third switch SW3 are turned on, and the other switches are turned off. In the second state φ2, the second switch SW2 and the fourth switch SW4 are turned on, and the other switches are turned off.

In the first state φ1, the flying capacitor $C_F$ is charged by the input voltage Vin, which generates a voltage difference between both terminals thereof, such that ΔV=Vin. In the second state φ2 after the first state φ1, one terminal (CP terminal) of the flying capacitor $C_F$ is grounded, which generates a negative voltage −ΔV=−Vin at the other terminal (CN terminal) of the flying capacitor $C_F$. The output capacitor $C_H$ is charged by the negative voltage −Vin via the fourth switch SW4. By alternating the first state φ1 and the second state φ2, a negative voltage is generated at the output terminal P2.

The voltage detection unit 20 compares the output voltage Vout generated at one terminal (OUT terminal) of the output capacitor $C_H$ with a predetermined negative threshold voltage Vt. The voltage detection unit 20 generates an abnormality detection signal S1 which is asserted when the output voltage Vout is higher than the threshold voltage Vt. The asserted signal may be high level, or may be low level.

FIGS. 3A through 3E are circuit diagrams each showing an example configuration of the voltage detection unit 20. A voltage detection unit 20a shown in FIG. 3A includes a current source 22, a transistor M10, a level shifter 24, and an inverter 26.

The current source 22 generates an electric current Io. The transistor M10 is configured as an N-channel MOSFET, and is arranged such that the drain thereof is connected to the current source 22, the gate thereof is grounded, and the output voltage Vout to be monitored is applied to the source thereof.

The voltage detection unit 20a outputs an abnormality detection signal S1 having a level that corresponds to the drain voltage Vd of the transistor M10. The level shifter 24 shifts the high-level voltage and the low-level voltage of the drain voltage Vd to respectively suitable voltage levels. The inverter 26 inverts the voltage Vd' thus level-shifted, so as to generate the abnormality detection signal S1.

Figure 4:
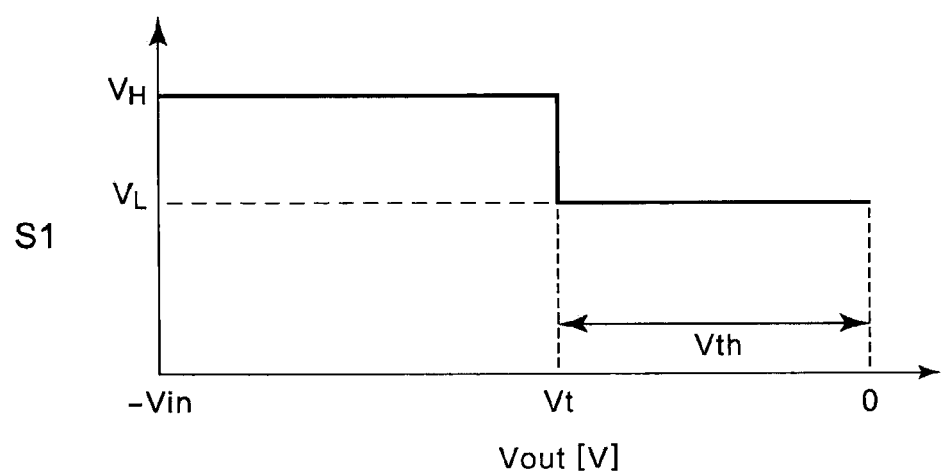
FIG. 4 is a graph showing the input/output characteristics of the output detection unit.

FIG. 4 is a graph which shows the input/output characteristics of the voltage detection unit 20a. The horizontal axis represents the output voltage Vout, and the vertical axis represents the abnormality detection signal S1.

When the gate-source voltage Vgs of the transistor M10 is higher than the threshold voltage Vth of the transistor M10, i.e., when the output voltage Vout is lower than the negative threshold voltage Vt=−Vth, the transistor M10 is turned on, and thus, the drain voltage Vd of the transistor M10 is set to low level. Accordingly, the abnormality detection signal S1, which is obtained by inverting the drain voltage Vd of the transistor M10, is set to high level (negated).

Conversely, when the gate-source voltage Vgs of the transistor M10 is lower than the threshold voltage Vth, i.e., when the output voltage Vout is higher than the negative threshold voltage Vt=−Vth, the transistor M10 is turned off, thereby setting the drain voltage Vd of the transistor M10 to high level. Thus, the abnormality detection signal S1, which is obtained by inverting the drain voltage Vd of the transistor M10, is set to low level (asserted).

As described above, with the voltage detection unit 20a shown in FIG. 3A, while having an extremely simple configuration, such an arrangement is capable of comparing the negative voltage Vout with the negative threshold voltage Vt, and of generating the abnormality detection signal S1 which represents the comparison result.

It should be noted that, in a case in which the high-level voltage $V_H$ and the low-level voltage $V_L$ of the drain voltage Vd each have a suitable voltage level for the downstream component, the level shifter 24 may be eliminated from the configuration shown in FIG. 3A. Also, in a case in which there is a desire to invert the asserted and negated levels of the abnormality detection signal S1, the inverter 26 may be eliminated.

FIGS. 3B through 3D respectively show voltage detection units 20b through 20d according to modifications. In such modifications, the level shifter 24 and the inverter 26 are omitted. The voltage detection unit 20b shown in FIG. 3B includes a resistor R10 arranged between the source of the transistor M10 and the OUT terminal, in addition to the configuration of the voltage detection unit 20a shown in FIG. 3A.

In addition to the configuration of the voltage detection unit 20b shown in FIG. 3B, the voltage detection unit 20c shown in FIG. 3C further includes a voltage source 23 configured to generate a positive or negative reference voltage Vref. The reference voltage Vref is applied to the gate of the transistor M10. With such a configuration, the threshold voltage Vt of the voltage detection unit 20c is represented by (Vth+Vref). Thus, by adjusting the reference voltage Vref, such an arrangement is capable of adjusting the threshold voltage Vt. Also, the resistor R10 included in the configuration shown in FIG. 3B may be eliminated.

FIG. 3D shows a configuration including a transistor M12 configured as a P-channel MOSFET, instead of the transistor M10. The transistor M12 is arranged such that the source thereof is grounded, and the output voltage Vout is applied to the gate thereof. A current source 25 is connected to the drain of the transistor M12, and generates a constant current Io.

With such a configuration, the gate-source threshold voltage Vth of the transistor M12 can be used as the threshold voltage Vt. It should be noted that, instead of the ground voltage, a positive or negative reference voltage Vref may be applied to the source of the transistor M12. In this case, the threshold voltage Vt is represented by (Vref+Vth). Thus, such an arrangement allows the threshold voltage Vt to be determined by adjusting the reference voltage Vref.

The voltage detection unit 20e shown in FIG. 3E includes a voltage source 27 configured to generate the threshold voltage Vt and a comparator 28 configured to compare the output voltage Vout with the threshold voltage Vt. Although the circuit area is increased, such an arrangement is capable of precise voltage comparison.

It should be noted that the configuration of the voltage detection unit 20 is not restricted to such arrangements shown in FIGS. 3A through 3E.

Returning to FIG. 2, the first switch SW1 is configured such that the resistance (on resistance) $R_{SW1}$ of the on state of the first switch SW1 can be switched between at least two resistance values. The first resistance value is set to a value which allows the charge pump circuit 2 in the normal state to supply a sufficient amount of load current $I_L$ to a load connected to the output terminal P2. The second resistance value is set to a value that is higher than the first resistance value in order to limit the load current $I_L$ when the circuit enters an abnormal state.

The abnormality detection signal S1 is input to the control unit 10. When the abnormality detection signal S1 is asserted, the control unit 10 raises the on resistance $R_{SW1}$ of the first switch SW1 in the on state.

Specifically, the first switch SW1 includes a main switch SW1a and a sub-switch SW1b arranged in parallel between the IN terminal and the CP terminal. The main switch SW1a is used to provide a first resistance value, and the sub-switch SW1b is used to provide a second resistance value. The on resistance Ron2 of the sub-switch SW1b is set to be higher than the on resistance Ron1 of the main switch SW1a.

When the abnormality detection signal S1 is asserted in the first state φ1, i.e., in the abnormal state, the control unit 10 turns on only the sub-switch SW1b. Conversely, when the abnormality detection signal S1 is negated, i.e., in the normal state, the control unit 10 turns on at least the main switch SW1a. In the normal state, the control unit 10 may turn on both the sub-switch SW1b and the main switch SW1a at the same time.

Figure 5:
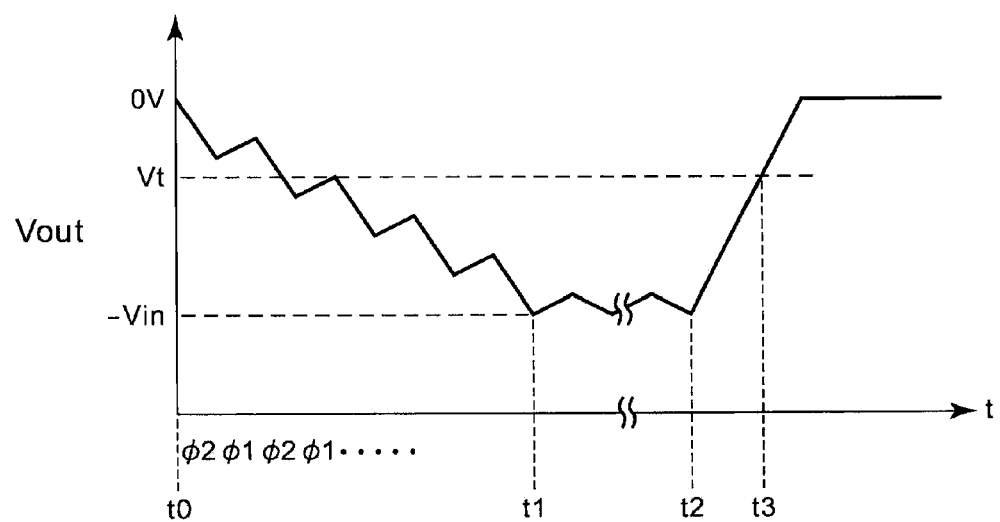
FIG. 5 is a waveform diagram which shows the operation of the charge pump circuit shown in FIG. 2.
Figure 5:
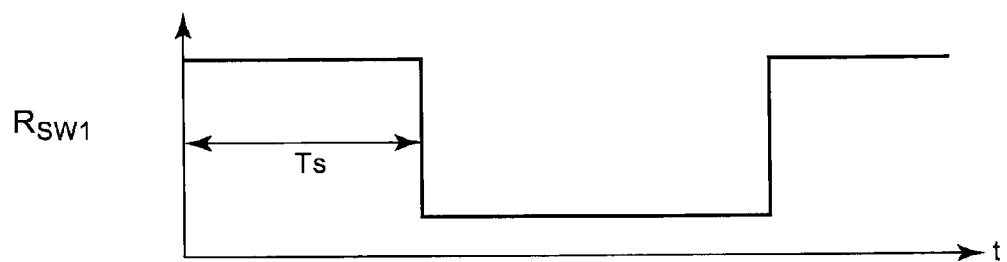

The above is the configuration of the charge pump circuit 2. Next, description will be made regarding the operation thereof. FIG. 5 is a waveform diagram which shows the operation of the charge pump circuit 2 shown in FIG. 2.

When the control circuit 100 receives an instruction to start up the charge pump circuit 2, the control circuit 100 alternately repeats the first state φ1 and the second state φ2 so as to charge the output capacitor $C_H$. As a result, the output voltage Vout is reduced from 0 V toward the target value −Vin. In this operation, the control circuit 100 prevents inrush current by means of an inrush current preventing function which has not been described above (t0 to t1). For example, in order to prevent inrush current, the on resistance $R_{SW1}$ of the first switch SW1 is set to a high value during a start-up period Ts immediately after the start-up operation. After the start-up period Ts, the on resistance $R_{SW1}$ of the first switch SW1 is returned to a normal value.

After the output voltage Vout reaches the target value, the first state φ1 and the second state φ2 are alternately repeated (t1 to t2).

Let us say that, at the time point t1, the CP terminal is shorted to ground. In this state, in the first state φ1, charge cannot be stored in the flying capacitor $C_F$. Accordingly, the charge cannot be transferred to the output capacitor $C_H$ in the second state φ2. As a result, the output voltage Vout rises over time (after t2).

Figure 1:
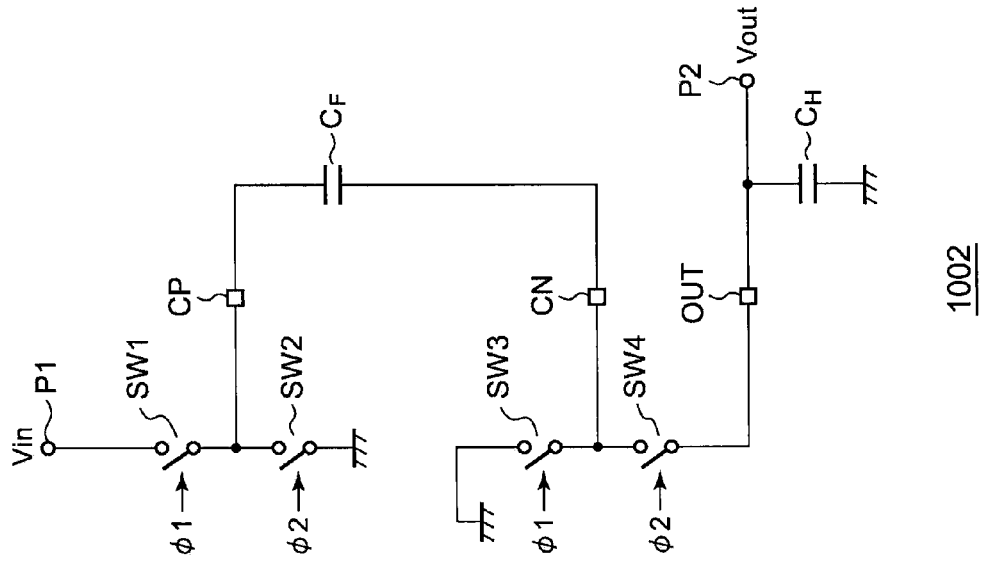
FIG. 1 is a circuit diagram which shows a circuit diagram showing a configuration of a charge pump circuit configured to generate a negative voltage.

In this case, with the conventional charge pump circuit as shown in FIG. 1, the IN terminal is connected via the first switch SW1 to the CP terminal shorted to ground for every cycle. In some cases, this leads to overcurrent at the first switch SW1.

In contrast, with the charge pump circuit 2 shown in FIG. 2, if the output voltage Vout rises up to the threshold voltage Vt, the on resistance of the first switch SW1 is raised (time point t3). As a result, the current that flows through the first switch SW1 is limited, thereby preventing overcurrent.

The charge pump circuit 2 is also capable of suppressing the occurrence of overcurrent when the OUT terminal (output terminal P2) is shorted to ground, in addition to a function of suppressing the occurrence of overcurrent when the CP terminal is shorted to ground. In this case, with conventional circuits, when the OUT terminal is shorted to ground, all the charge stored in the flying capacitor $C_F$ flows out and becomes zero in the second state φ2. Accordingly, when the state transits to the next first state φ1, if the current is not limited, overcurrent flows from the input terminal P1 to the flying capacitor $C_F$.

If the OUT terminal is shorted to ground, the output voltage Vout rises, and becomes higher than the threshold voltage Vt. In this state, with the charge pump circuit 2 shown in FIG. 2, the abnormality detection signal S1 is asserted. When the abnormality detection signal S1 is asserted, the on resistance $R_{SW1}$ of the first switch SW1 is raised, thereby appropriately suppressing overcurrent at the flying capacitor $C_F$.

Figure 6:
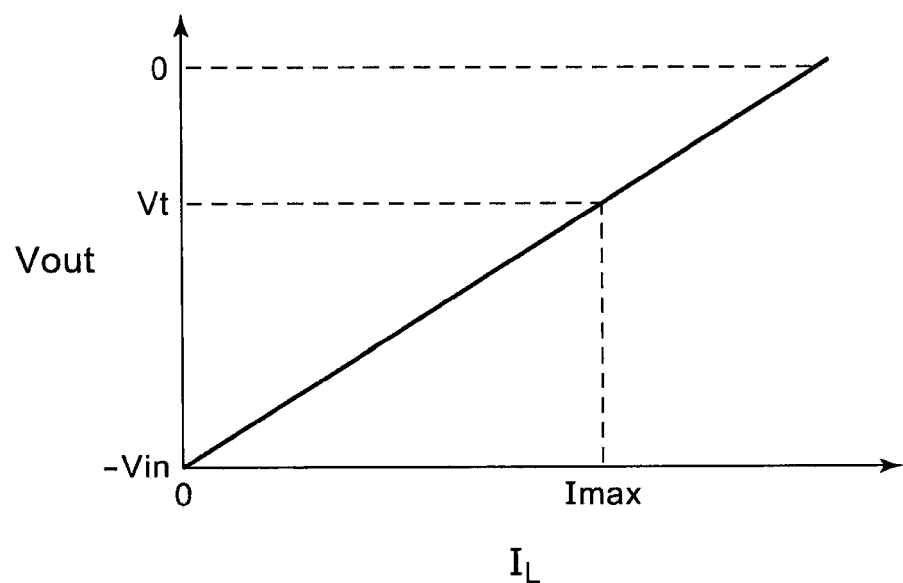
FIG. 6 is a graph which shows the relation between the load current IL and the output voltage Vout of the charge pump circuit.

The above are the operations and the advantages of the charge pump circuit 2. Furthermore, the charge pump circuit 2 has the following advantages. FIG. 6 is a graph which shows the relation between the load current $I_L$ and the output voltage Vout of the charge pump circuit 2. With the charge pump circuit 2, as the load current $I_L$ becomes very large, it becomes impossible to maintain the output voltage Vout at the target value, leading to an increase in the output voltage Vout. With the charge pump circuit 2 shown in FIG. 2, if the output voltage Vout exceeds the threshold voltage Vt, the on resistance $R_{SW1}$ of the first switch SW1 rises, thereby limiting the input current. In the charge pump circuit 2, the input current is equal to the load current $I_L$. Accordingly, by limiting the input current, such an arrangement is capable of limiting the load current $I_L$.

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement configured to control the on resistance $R_{SW1}$ of the first switch SW1. Also, in addition to this, the on resistance $R_{SW2}$ of the second switch SW2 may be controlled. Specifically, the second switch SW2 may be configured in the same way as the first switch SW1. With such an arrangement, when the abnormality detection signal S1 is asserted, the on resistance $R_{SW2}$ may be raised. With such a modification, even if the CN terminal is shorted to the power supply terminal (connected to the power supply terminal), overcurrent can be appropriately prevented.

Description has been made in the embodiment regarding a charge pump circuit in which the target value of the output voltage Vout is −Vin. Also, the charge pump circuit 2 may have a function for regulating the output voltage Vout to a desired voltage level. Specifically, the on resistance or on time of any one of the switches SW1 through SW4 may be controlled by performing a feedback operation on the output voltage Vout such that it matches a target value.

Description has been made in the embodiment regarding an arrangement in which the first switch SW1 comprises multiple switches. However, the present invention is not restricted to such an arrangement. In a case in which the first switch SW1 is configured as a MOSFET, by controlling the gate voltage, such an arrangement is capable of switching the on resistance. Thus, the control unit 10 may perform a control operation in which, when the abnormality detection signal S1 is negated, the gate-source voltage is increased such that the first switch SW1 becomes the full-on state, and when the abnormality detection signal S1 is asserted, the gate-source voltage of the first switch SW1 is reduced such that the on resistance of the first switch SW1 is increased.

Figure 7:
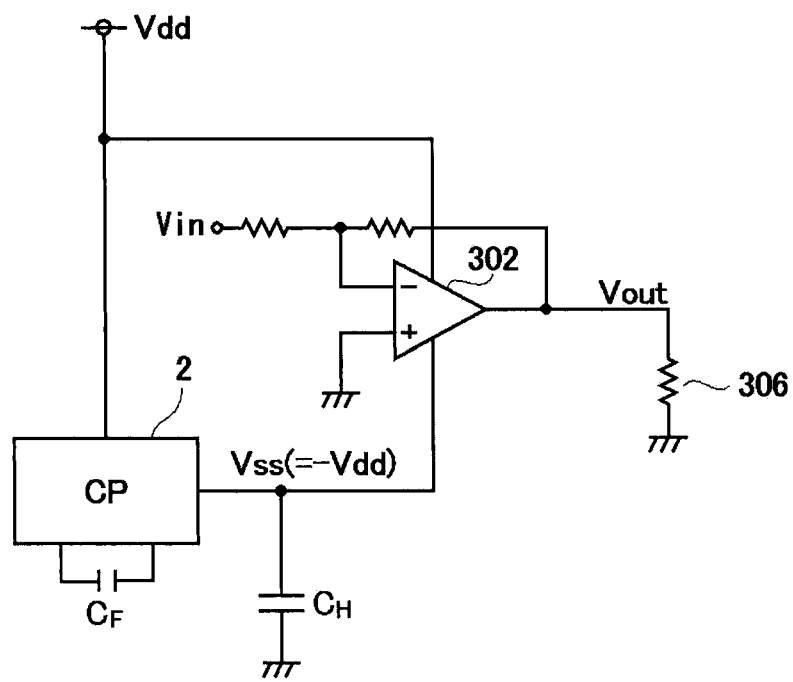
FIG. 7 is a block diagram which shows a configuration of an audio system including the charge pump circuit shown in FIG. 2.

Lastly, description will be made regarding a suitable application of the charge pump circuit 2. FIG. 7 is a block diagram which shows a configuration of an audio system 300 including the charge pump circuit 2 shown in FIG. 2.

The audio system 300 includes a headphone amplifier or a speaker amplifier (which is also referred to collectively as a "main amplifier" or a "power amplifier") 302, an inverting charge pump circuit 2, and a speaker 306. The main amplifier 302 is configured as an inverting amplifier, for example. The main amplifier 302 is configured to invert and amplify the input voltage Vin, and to output the output voltage Vout to the speaker 306. The main amplifier 302 receives a battery voltage Vdd as a positive power supply voltage. The inverting charge pump circuit 2 inverts the battery voltage Vdd so as to generate a negative power supply voltage Vss for the main amplifier 302. The charge pump circuit 2 according to the embodiment is suitably employed in such an audio system 300.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a negative voltage charge pump circuit configured to receive an input voltage and to generate a negative output voltage, the control circuit comprising:
 a first switch arranged between one terminal of a flying capacitor and an input terminal;
 a second switch arranged between the aforementioned one terminal of the flying capacitor and a ground terminal;
 a third switch arranged between the other terminal of the flying capacitor and the ground terminal;
 a fourth switch arranged between the other terminal of the flying capacitor and one terminal of the output capacitor;
 a control unit configured to alternately repeat a first state in which the first switch and the third switch are on and a second state in which the second switch and the fourth switch are on; and
 a voltage detection unit configured to compare the output voltage that occurs at the aforementioned one terminal of the output capacitor with a predetermined negative voltage, and to generate an abnormality detection signal which is asserted when the output voltage is higher than the threshold voltage,
 wherein, when the abnormality detection signal is asserted, the control unit raises the on resistance of the first switch in the on state.

2. A control circuit according to claim 1, wherein the first switch comprises a main switch having a first on resistance and a sub-switch having a second on resistance that is higher than the first on resistance,
 and wherein, when the abnormality detection signal is asserted in the first state, the control unit turns on only the sub-switch,
 and wherein, when the abnormality detection signal is negated, the control unit turns on at least the main switch.

3. A control circuit according to claim 1, wherein the first switch comprises a plurality of switches arranged in parallel,
 and wherein the control unit switches, according to the abnormality detection signal, the switch which is to be turned on in the first state.

4. A control circuit according to claim 1, wherein the first switch is configured as a MOSFET (Metal Oxide Semiconductor Field Effect Transistor),
 and wherein the control unit is configured to change the gate voltage of the first switch so as to change the on resistance of the first switch.

5. A control circuit according to claim 1, wherein the voltage detection unit comprises:
 a current source; and
 an N-channel MOSFET arranged such that the drain thereof is connected to the current source, the output voltage is applied to the source thereof, and the gate is set to a fixed electric potential,
 and wherein a signal that corresponds to a voltage that occurs at the drain of the N-channel MOSFET is output as the abnormality detection signal.

6. A control circuit according to claim 5, wherein a ground voltage is applied to the gate of the N-channel MOSFET.

7. A control circuit according to claim 5, wherein a positive or negative reference voltage is applied to the gate of the N-channel MOSFET.

8. A control circuit according to claim 5, wherein the voltage detection unit further comprises a resistor arranged between the source of the N-channel MOSFET and the output voltage terminal.

9. A control circuit according to claim 1, wherein the voltage detection unit comprises a comparator configured to compare the output voltage with a predetermined reference voltage,
 and wherein the voltage detection signal is configured to output an output signal of the comparator as the abnormality detection signal.

10. A control circuit according to claim 1, wherein the voltage detection unit comprises:
 a P-channel MOSFET arranged such that the source thereof is grounded, and the output voltage is applied to the gate thereof; and
 a current source connected to the drain of the P-channel MOSFET,
 and wherein a signal that corresponds to a voltage that occurs at the drain of the P-channel MOSFET is output as the abnormality detection signal.

11. A control circuit according to claim 1, wherein, when the abnormality detection signal is asserted, the control unit raises the on resistance of the second switch in the on state.

12. A charge pump circuit configured to receive an input voltage and to generate a negative output voltage comprising:
 a flying capacitor;
 an output capacitor; and
 a control circuit connected to the flying capacitor and the output capacitor,
 wherein the control circuit comprises:
 a first switch arranged between one terminal of a flying capacitor and an input terminal;
 a second switch arranged between the aforementioned one terminal of the flying capacitor and a ground terminal;
 a third switch arranged between the other terminal of the flying capacitor and the ground terminal;
 a fourth switch arranged between the other terminal of the flying capacitor and one terminal of the output capacitor;

a control unit configured to alternately repeat a first state in which the first switch and the third switch are on and a second state in which the second switch and the fourth switch are on; and a voltage detection unit configured to compare the output voltage that occurs at the aforementioned one terminal of the output capacitor with a predetermined negative voltage, and to generate an abnormality detection signal which is asserted when the output voltage is higher than the threshold voltage, wherein, when the abnormality detection signal is asserted, the control unit raises the on resistance of the first switch in the on state.

13. An electronic device comprising:

a battery; and a charge pump circuit configured to receive a voltage from the battery, and to generate a negative voltage, the charge pump circuit comprising:

a flying capacitor;

an output capacitor; and a control circuit connected to the flying capacitor and the output capacitor, wherein the control circuit comprises:

a first switch arranged between one terminal of a flying capacitor and an input terminal;

a second switch arranged between the aforementioned one terminal of the flying capacitor and a ground terminal;

a third switch arranged between the other terminal of the flying capacitor and the ground terminal;

a fourth switch arranged between the other terminal of the flying capacitor and one terminal of the output capacitor;

a control unit configured to alternately repeat a first state in which the first switch and the third switch are on and a second state in which the second switch and the fourth switch are on; and a voltage detection unit configured to compare the output voltage that occurs at the aforementioned one terminal of the output capacitor with a predetermined negative voltage, and to generate an abnormality detection signal which is asserted when the output voltage is higher than the threshold voltage, wherein, when the abnormality detection signal is asserted, the control unit raises the on resistance of the first switch in the on state.

14. An audio system comprising:

an amplifier configured to amplify an audio signal; and a charge pump circuit configured to supply a negative power supply voltage for the amplifier, the charge pump circuit comprising:

a flying capacitor;

an output capacitor; and a control circuit connected to the flying capacitor and the output capacitor, wherein the control circuit comprises:

a first switch arranged between one terminal of a flying capacitor and an input terminal;

a second switch arranged between the aforementioned one terminal of the flying capacitor and a ground terminal;

a third switch arranged between the other terminal of the flying capacitor and the ground terminal;

a fourth switch arranged between the other terminal of the flying capacitor and one terminal of the output capacitor;

a control unit configured to alternately repeat a first state in which the first switch and the third switch are on and a second state in which the second switch and the fourth switch are on; and a voltage detection unit configured to compare the output voltage that occurs at the aforementioned one terminal of the output capacitor with a predetermined negative voltage, and to generate an abnormality detection signal which is asserted when the output voltage is higher than the threshold voltage, wherein, when the abnormality detection signal is asserted, the control unit raises the on resistance of the first switch in the on state.

* * * * *